（12） United States Patent
Theis et al.

(10) Patent No.: US 8,424,359 B2
(45) Date of Patent: Apr. 23, 2013

(54) BENDING PRESS WITH A LOADING DEVICE AND METHOD FOR ITS OPERATION

(75) Inventors: Helmut Theis, Pfarrkirchen (AT); Otto Walter, Marchtrenk (AT); Hagen Strasser, Pasching (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 642 days.

(21) Appl. No.: 12/161,394

(22) PCT Filed: Jan. 4, 2007

(86) PCT No.: PCT/AT2007/000001
§ 371 (c)(1),
(2), (4) Date: Jun. 28, 2010

(87) PCT Pub. No.: WO2007/082323
PCT Pub. Date: Jul. 26, 2007

(65) Prior Publication Data
US 2010/0269555 A1      Oct. 28, 2010

(30) Foreign Application Priority Data

Jan. 19, 2006  (AT) .................................. A 82/2006

(51) Int. Cl.
*B21J 13/00*       (2006.01)
*B21C 51/00*       (2006.01)
(52) U.S. Cl.
USPC ............................ 72/420; 72/21.1; 72/389.3
(58) Field of Classification Search .................... 72/3, 4, 72/21.1, 380, 381, 389.1, 389.3, 405.09, 72/405.12, 405.13, 405.16, 419, 420, 422; 414/222.01, 627, 749.1, 751.1, 752.1
See application file for complete search history.

(56) References Cited

U.S. PATENT DOCUMENTS 4,971,515 A * 11/1990 Pol et al. ........................ 414/797
6,938,454 B2 * 9/2005 Strasser et al. ................... 72/420

FOREIGN PATENT DOCUMENTS

| DE | 43 22 963 | 2/1995 |
| JP | 62-59826 | 3/1987 |
| JP | 8-94424 | 4/1996 |
| WO | WO 03/095125 | 11/2003 |
| WO | WO 2004/028939 | 4/2004 |

OTHER PUBLICATIONS

International Search Report for PCT Application No. PCT/AT2007/000001; Filed Jan. 4, 2007; Date of Completion May 4, 2007; Date of Mailing May 21, 2007.
International Preliminary Report on Patentability; Date of Completion Nov. 12, 2007; Date of Mailing Apr. 24, 2008.

\* cited by examiner

*Primary Examiner* — Teresa M Ekiert
(74) *Attorney, Agent, or Firm* — Alston & Bird LLP

(57) ABSTRACT

The invention describes a manufacturing device (1) and a method for bending blanks (4) or workpieces (5), having a bending press (2) and having a manipulator (3), which can be displaced in a raceway parallel to a longitudinal extent of a table and bending beam (10, 14), for workpiece transfer between a feeding or removal apparatus for the blanks (4) or the workpieces (5) and a forming region between bending tools (21). The manipulator (3) has an articulated-arm arrangement (33) having preferably three arms (34, 35, 36) which can be pivoted via pivoting bearing arrangements (37) about pivot axes (39) which are oriented parallel to the raceway, and said manipulator has a rotary unit (41), having a rotational axis (42) which extends perpendicularly with respect to the pivot axes (39), at one distal end of the articulated-arm arrangement (33). At least one detection device (50) which has a communications link to the control and monitoring device (25) is arranged on the articulated-arm arrangement (33), for a physical value which brings about a state change of an arm (34, 35, 36) of the articulated-arm arrangement (33) upon loading.

10 Claims, 3 Drawing Sheets

BENDING PRESS WITH A LOADING DEVICE AND METHOD FOR ITS OPERATION

BACKGROUND OF THE INVENTION

The invention relates to a production device for the bending deformation of boards or workpieces, and an associated method.

WO 03/095125 A2 relates to a production device, in particular a bending press, and a method for operating the production device for the bending deformation of boards with a bending press, with a fixed table beam and a press beam which is adjustable by a drive arrangement relative to the table beam in guides on a machine frame between bending tools. The workpiece manipulation is performed by means of a bending arm manipulator, which on a distal end of the bending arm arrangement comprises a rotational unit with a rotational axis running perpendicularly to the pivot axes of the bending arm arrangement and with a gripping device arranged on the rotational unit. The bending arm arrangement comprises at least one detecting device connected by communication to a control and monitoring device for the identification and recognition of the position of the boards already placed and supplied on a deposit or feed device.

From the document U.S. Pat. No. 4,971,515 A a manipulator is known with a gripping device for picking up workpieces from a stack and supplying them to a production device, wherein the lifting device comprises a measuring unit for determining a value of a selectable parameter, e.g. the thickness of the workpiece and which is compared in an automated method step with a predefined parameter reference value by a control device.

From WO 2004/028939 A1 an automated production device, in particular a bending press, with a manipulator for the transfer of workpieces between a workpiece deposit and/or feeding device and the bending press. The manipulator is provided with a gripping device. The gripping device comprises a detecting device, which is used to establish whether one or more boards or workpieces have been taken up. The detection is performed by evaluating a vibrational spectrum after exciting vibrations of the board or the workpiece or by means of pressure sensors assigned directly to the suction grippers.

Furthermore, measures are known from the prior art for limiting the supply by means of pre-separating a workpiece to be picked up, e.g. using expanding magnets, or using image processing measuring devices for determining the number of mounted boards. Also the use of tactile, inductive or capacitative sensors is known from the prior art with a suitable measurement structure for identifying whether one single board or several boards have been picked up by adhesion.

The use of a palette scale connected by communication to the control device of the production device is also known, by means of which after picking up a board or a workpiece determines the total weight of the remaining stack and the computer of the control device determines the differential value from the preceding measurement and this differential value is used in a plausibility check with a saved reference value.

The objective of the invention is to create a production device for the fully automated manufacture of moulded sheet metal parts, in which immediately after picking up a workpiece with a gripping device of a manipulator by determining a physical value a plausibility check is performed with a predefined reference value stored in a control device of the production device.

SUMMARY OF THE INVENTION

Said objective of the invention is achieved by means of a detecting device integrated into the kinematics of the manipulator, so that regardless of the material properties of the picked up workpiece, the check is performed immediately when picking up the workpiece and in this way unproductive and expensive downtimes can be effectively avoided and in a detecting process several measurement results are provided simultaneously for evaluating an average value, whereby regardless of a possible eccentric pick up of a board or a workpiece an evaluation and comparison are possible with a predefined reference value. An embodiment in which the measuring elements of the measuring device are connected by line to a charge amplifier is also advantageous, in which the required precision for evaluating the result of the measurement is achieved.

An embodiment in which the measuring elements are formed by disc-like quartz sensors is also advantageous, in which a highly sensitive measuring element is provided, which can be integrated into a structure to be measured with little additional effort.

Also disclosed are embodiments in which the measurement plane runs in a joint face running perpendicular to the rotational axis of the rotational device; in which the quartz sensors are tensioned by a pretensioning force between opposite tensioning surfaces running parallel to the measurement plane; and in which the quartz sensors are pretensioned between an end face part of the C-arm and a flange of the rotational device. These embodiments are advantageous, as in this way the measurement value can be detected whilst avoiding disruptive influences caused by the structure very close to the gripping device and thus in the vicinity of the object mounted by the gripping device to be evaluated.

According to other advantageous developments, as described herein, no additional expensive mounting parts or built-on parts are necessary, whereby a very economical solution can be achieved.

Furthermore, also described is an advantageous arrangement of the measuring elements which enables a clear evaluation of several measurement results determined in a measurement process.

Lastly, further embodiments are described wherein the measurement arrangement can be linked with little cabling and control means to the control system of the production device.

The invention also relates to a method for operating a production device.

The objective of the method according to the invention is to ensure for the operation of a production device, in particular a bending press, which is loaded by means of a handling device with boards or workpieces provided for shaping, that only one board or workpiece is picked up to be fed to the shaping tools.

Said objective of the invention is achieved in that a check and comparison with a stored reference value is performed immediately after picking up a board or a workpiece from a stack with a gripping device without a substantial lengthening of the clock time.

BRIEF DESCRIPTION OF THE DRAWINGS

The invention is explained in more detail in the following with reference to the exemplary embodiments shown in the drawings.

DETAILED DESCRIPTION OF THE DRAWINGS

Figure 1:
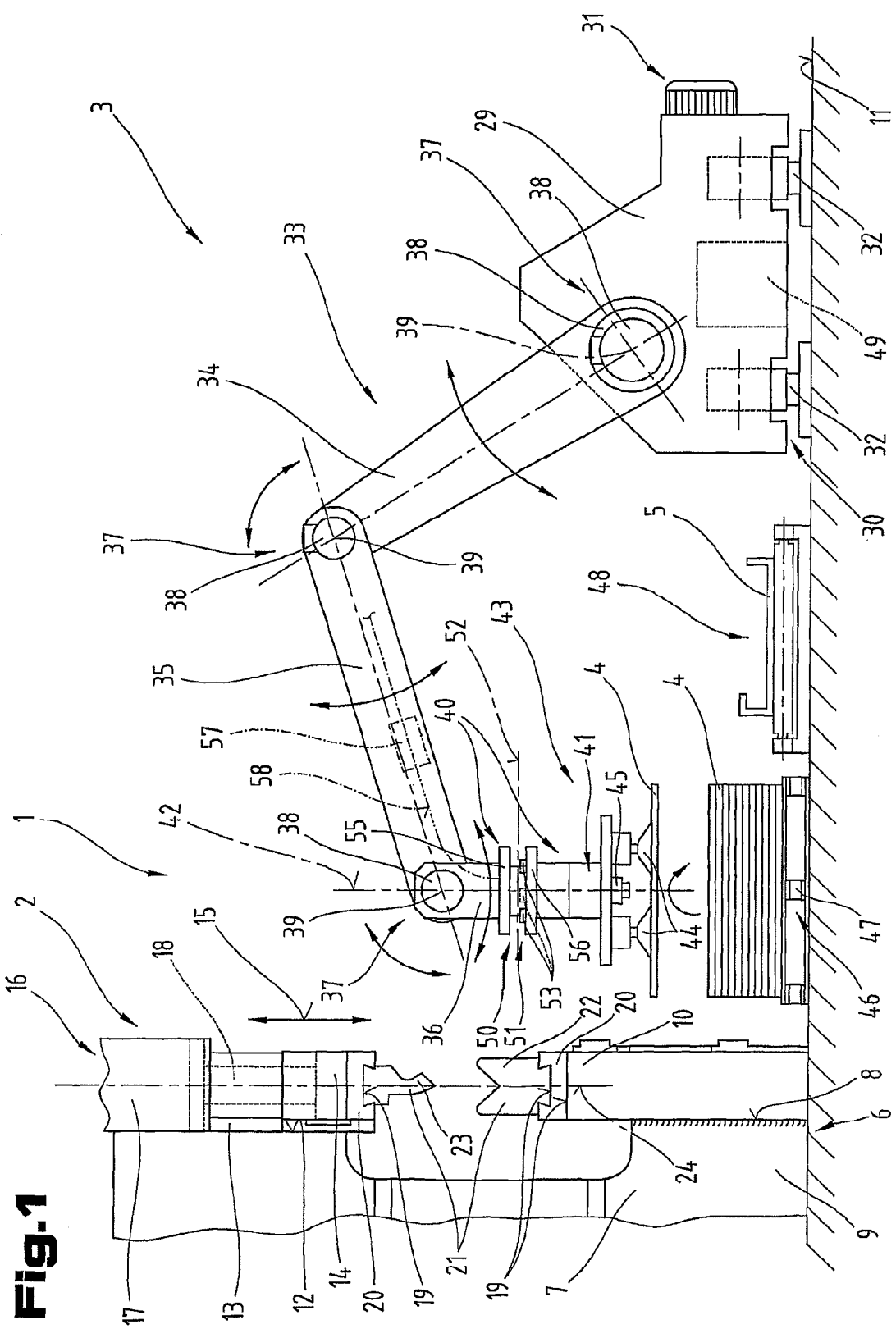
FIG. 1 shows a production device according to the invention with a bending press and a manipulator and a detecting device on an arm arrangement in a simplified view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows a production device 1, which consists essentially of a bending press 2 and a manipulator 3 and the production consists of bending workpieces 5 from boards 4. The boards 4 are preferably stacked on a palette in an operating area of the manipulator 3. The palette can also be used for example for mounting the shaped workpieces 5, and it is of course also possible to transfer the workpieces 5 for further processing in transport containers, conveying devices etc. after the bending deformation.

A machine frame 6 of the bending press 2 is formed essentially by two parallel and spaced apart C-shaped stand side flanges 7 and an also not shown cross-tie. On end faces 8 of arms 9 of the stand side flanges 7 a table beam 10 is secured in vertical alignment to a standing surface 11. On additional arms 12 in guides 13 aligned perpendicularly to the standing surface 11a press beam 14 is mounted adjustably-according to double arrow 15. Drives 16 for the press beam 14 form for example hydraulic cylinders 17, of which at least one preferably two are secured to the arms 12 of the stand side flanges 7 as a tandem drive and each one is drive-connected via a piston rod 18 to the press beam 14. Cooperating bending tools 21, e.g. a bending die 22 and a bending stamp 23 are arranged aligned to one another in an operating plane 24 on parallel end faces 19 of the table beam 10 and the press beam 14 running parallel to one another and opposite one another parallel to the standing surface 11 in tool mounting devices 20, for the bending deformation of a supplied workpiece 4. Preferably, the bending tools 21 are formed as necessary on a bending length by a plurality of bending dies 22 or bending stamps 23 arranged in a row next to one another.

It should also be noted that the bending press 2, as shown in a much simplified view, is equipped with a control device 25, drive device 26 for the drives 16 and a monitoring device connected by line to the control device 25, e.g. a distance measuring device, force measuring device, deformation measuring means and a not shown safety device according to the respective requirement.

The manipulator 3 of the production device 1 according to the shown exemplary embodiment comprises a moving device 30 arranged in a base frame 29, e.g. a roller moving device and travel drive 31, or can be moved on linear guiding tracks 32 arranged on the standing surface 11 in a direction running parallel to the operating plane 24 of the bending press 2.

A bending arm arrangement 33 is formed by an A-arm 34 mounted pivotably on the base frame 29, a B-arm 35 mounted pivotably thereon and a C-arm 36 mounted pivotably on the latter. Pivot bearing arrangements 37 of the bending arm arrangement 33 have individually controlled pivot drives 38 and pivot axes 39 and pivot axes 39 formed by the pivot bearing arrangements 37 run parallel to the operating plane 24 and the standing surface 11.

At a distal end 40 of the C-arm 36 on the face side a rotary device 41 is arranged with a rotational axis 42 running perpendicular to the pivot axes 39. The latter is provided with a gripping device 43 for manipulating the workpiece 4. For example, the gripping device 43 is formed by suction grippers 44 which can be charged by pressure or vacuum. Preferably, the gripping device 43 in addition to being provided with suction grippers 44 also comprises for the correct mounting of the board 4 or an already partly shaped workpiece 5 a workpiece identification and/or positioning device 45, e.g. with a CCD camera as an image detecting device, lighting means, etc.

In the gripping area of the manipulator 3 also a board or workpiece supply 46 is provided, e.g. on palettes 47, as well as a collecting or removing device 48 for already shaped workpieces 5.

It is possible to operate the manipulator 3 with a subcontrol 49 connected to the control device 25 of the bending press 2 by cable, and it is also possible to operate the manipulator 3 with the control device 25 of the bending press 2 and to equip the manipulator 3, e.g. via drum cables and trailing cables with a pressure medium for the power supply and provision.

The bending arm arrangement 33 of the manipulator 3 is provided with at least one detecting device 50, by means of which at least one physical parameter causing a change in state on picking up a board 4 or a workpiece 5 is determined, e.g. a parameter that is definitive of tensile loading and/or bending loading 5 in or on an arm of the bending arm arrangement 33 by the weight of the mounted board 4 or workpiece 5.

In the shown exemplary embodiment the detecting device 50 is provided between the C-arm 36 and the rotary device 40 as a measuring device 51 for tensile loading, which in a measurement plane 52 running perpendicular to the rotary axis 41 comprises quartz sensors 53 as measuring sensors 54. Preferably, three quartz sensors 53 are provided distributed evenly about the rotational axis and the latter are arranged under a predefined pretensioning between measurement plates 55, 56. The measuring device 51 is secured onto the C-arm 36 with one of the measurement plates 55. On the additional measurement plate 56 the rotational device 40 provided with the gripper device 43 is secured. A charge amplifier 57 is provided for controlling the quartz sensors 53 and for signal amplification and signal evaluation, which is connected via a control line 58 to the control system of the production device 1 or the manipulator 3. Preferably, a CAN bus system is used as the control system, which has functional and also economical advantages by reducing the amount of cabling.

Figure 2:
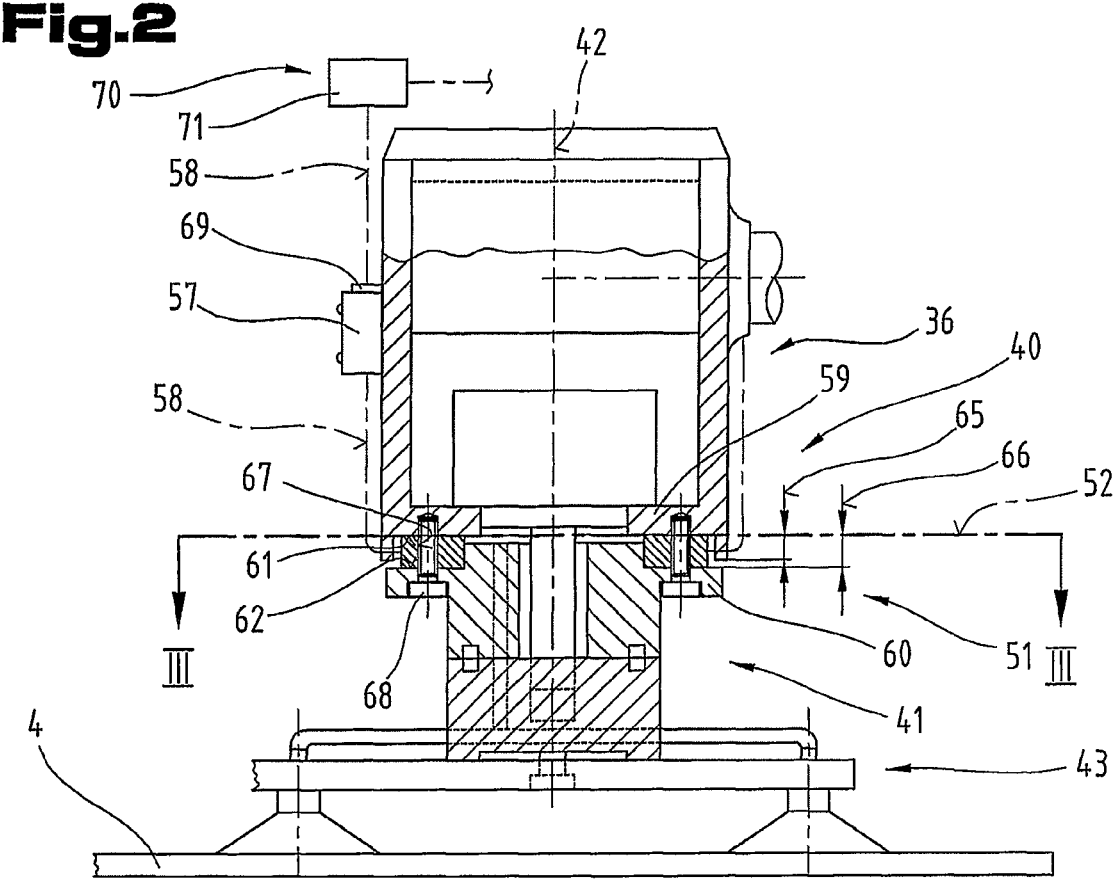
FIG. 2 shows a detailed view of the arm arrangement with a further variant of the detecting device, partly in cross section.
Figure 3:
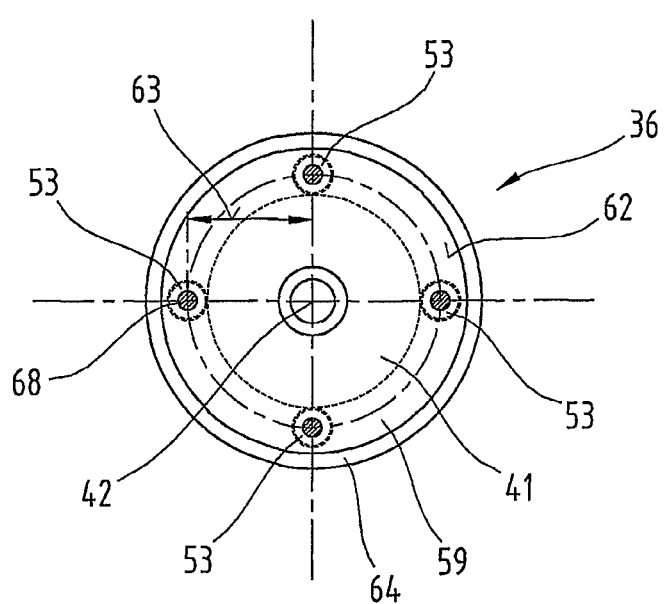
FIG. 3 shows the arm arrangement in cross section along the lines III-III in FIG. 2.

FIGS. 2 and 3 show a further exemplary embodiment for an arrangement or design of the detecting device 50 in detail. The installation of the detecting device 50 is shown between an end wall part 59 which forms the distal end 40 of the C-arm 36 and a flange 60 of the rotational unit 41.

Between facing, parallel bearing areas 61, 62 of the end wall part 59 and the flange 60 according to this exemplary embodiment in an angular distribution of 90° four of the disc-like quartz sensors 53 are arranged about the rotational axis 42 in a uniform radial distance 63 from the latter. The quartz sensors 53 are arranged preferably covered by a peripheral edge beading 64, which projects over the bearing surface 61 and thus protects from disruptive influences. The height 65 of the edge beading 64 is slightly smaller than the thickness 66 of the quartz sensors 53. The rotational unit 41 is secured to the C-arm 36 via the flange 60 by means of the quartz sensors 53 in tensioning screws 68 passing through bores 67. By means of this arrangement of the tensioning screws 68 which pass through the quartz sensors 53 in their bores 67, a precisely predetermined pretensioning of the quartz sensors 53 is achieved. A pretensioning force of about 2 kN has proved to be advantageous in trials.

The quartz sensors 53 are connected via the control lines 58 to the charge amplifier 57, which is arranged for example directly on the C-arm 36 and connected via an interface 69 to the bus control system of the production device 1.

After picking up a board 4 or workpiece 5 with the gripping device 43 after a slight lifting movement the lifting process is interrupted. A position of the C-arm 36 in a vertical alignment of the longitudinal middle axis 42 in which the measurement plane 52 of the measuring device 51 is aligned approximately parallel to the standing surface 11 is preferable. In this position the weight of the mounted part acts for example as a physical parameter for a change in state of an arm of the bending arm arrangement 3 against the pretensioning force acting on the quartz sensors 53 and thus changes the measurement signals of the quartz sensors 53.

During a brief stop of the arm movement independent of the position the actual measurement signals of the quartz sensors 53 are determined and evaluated in a computer module 70 and compared in a comparator circuit 71 with a reference value, which has been established in a learning process upstream of the production process with a similar type of board 4 or workpiece 5 and saved in a file. If they coincide, whereby a predefinable tolerance width is taken into consideration, it is ensured that the picked up board or workpiece is the board or workpiece provided for the production process and several boards 4 or workpieces 5, e.g. stuck together, are not picked up. If the tolerance range is exceeded the production process is interrupted and an error message is given.

Instead of the aforementioned learning process before starting the actual production the reference value can of course also be taken over directly from the board or workpiece related product data saved or savable in the control device.

By arranging several quartz sensors 53 and evaluating the signals emitted by the latter also a reliable detection of the physical parameter of the board 4 or workpiece 5 is ensured, even with an eccentric pick up of the board 4 or the workpiece 5 by the gripping device 43, as required many times for shaping in the bending press 2.

Figure 4:
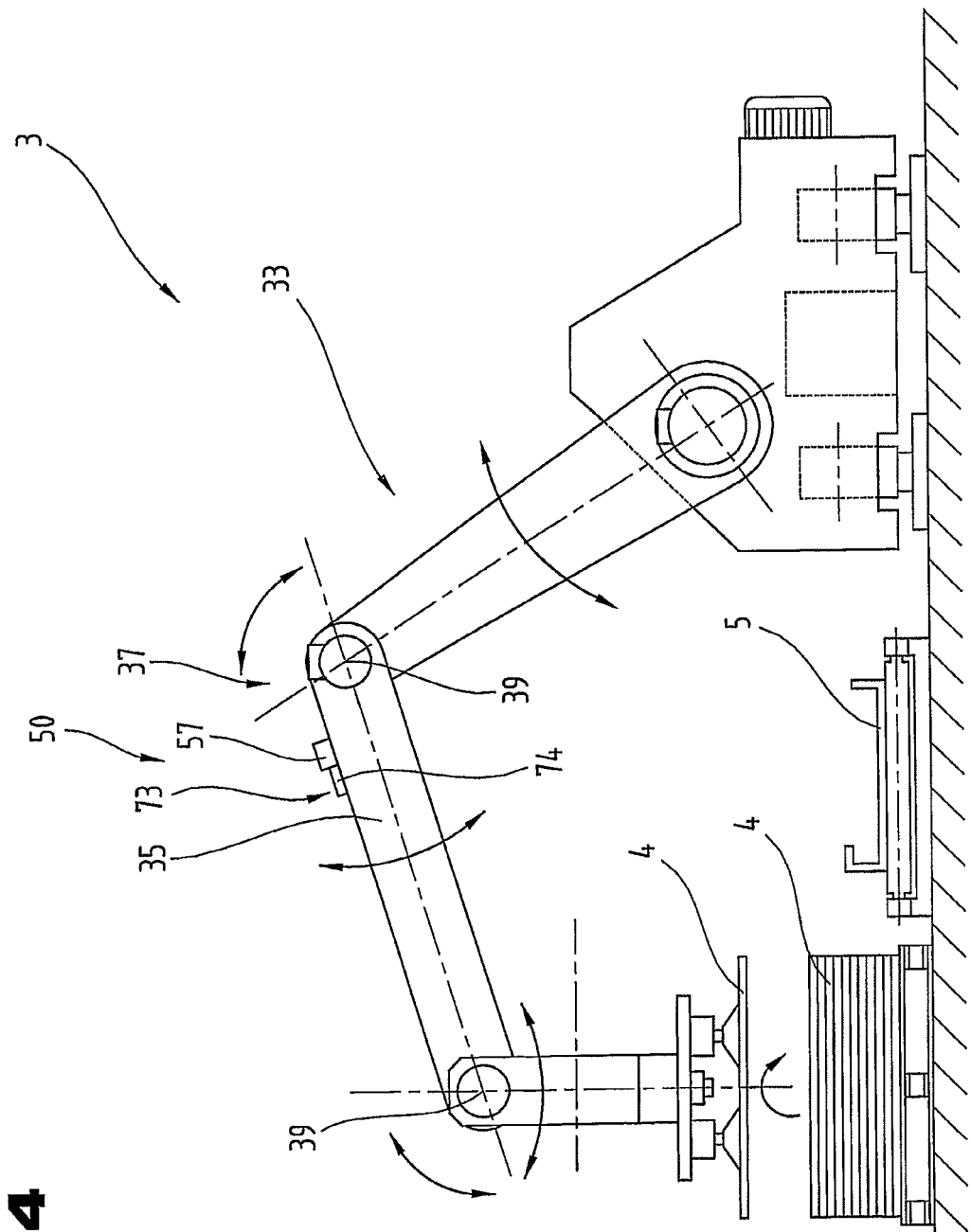
FIG. 4 shows a further embodiment of a detecting device on the arm arrangement of the manipulator of the production device according to the invention.

FIG. 4 shows a further embodiment of the detecting device 50 on the bending arm arrangement 33 of the manipulator 3 for loading a not shown bending press, by means of which it is ensured that only a single board 4 is supplied for a shaping process.

The detecting device 50 is formed by a measurement element 73 arranged directly on an arm surface 72, in particular the B-arm 35 in the vicinity of the pivot bearing arrangement 37 and the charge amplifier 57 line-connected to the control system. The measuring element 73 in this embodiment is preferably a piezo-electrical surface expansion sensor 74. The latter is arranged in the basic position of the bending arm arrangement 33 for mounting the board 4 on the tension-loaded upper side of the B-arm 35. To check whether for the shaping process the correct board and only one board 4 or only one workpiece 5 has been picked up, the detected physical value is the change in expansion by the additional load from the board 4 or the workpiece 5. The determined change in expansion is as already described above is compared with a predetermined reference value with a tolerance range. If a deviation from this is established the loading process can be interrupted straight away.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

The exemplary embodiments show possible embodiment variants of the production device 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the production device the latter and its components have not been represented true to scale in part and/or have been enlarged and/or reduced in size.

The underlying problem addressed by the independent solutions according to the invention can be taken from the description.

Mainly the individual embodiments shown in FIGS. 1; 2, 3; 4 can form the subject matter of independent solutions according to the invention. The objectives and solutions according to the invention relating thereto can be taken from the detailed descriptions of these figures.

LIST OF REFERENCE NUMERALS

1 Production device
2 Bending press
3 Manipulator
4 Board device
5 Workpiece
6 Machine frame
7 Stand side flange
8 End face
9 Arm
10 Table beam
11 Standing surface
12 Arm
13 Guides
14 Press beam
15 Double arrow
16 Drive arrangement
17 Hydraulic cylinder
18 Piston rod
19 End face
20 Tool mount
21 Bending tool
22 Bending die
23 Bending stamp 24 Working plane
25 Control and monitoring device
26 Drive device
29 Base frame
30 Traversing gear
31 Traversing drive
32 Track
33 Bending arm arrangement
34 A-arm
35 B-arm
36 C-arm
37 Pivot bearing arrangement
38 Pivot drive
39 Pivot axis
40 End
41 Rotational device
42 Rotational axis
43 Gripping device
44 Suction gripper
45 Workpiece identification and/or positioning
46 Workpiece provision
47 Palette
48 Manipulator-collecting device
49 Control
50 Detecting device
51 Measuring device
52 Measurement plane
53 Quartz sensor
54 Measurement plate
55 Measurement counter plate
57 Charge amplifier
58 Control line
59 End wall part
60 Flange
61 Bearing surface
62 Bearing surface
63 Distance
64 Edge bead
65 Height
66 Thickness
67 Bore
68 Tensioning screw
69 Interface
70 Computer module
71 Comparator circuit
72 Arm surface
73 Measuring element
74 Surface expansion sensor

The invention claimed is:

1. Production device for the bending deformation of boards or workpieces, comprising a bending press, a fixed table beam and a press beam adjustable by means of a drive arrangement relative to the table beam in guides on a machine frame and comprising bending tools arranged on facing end faces of the table beam and the press beam and a manipulator which can be driven in a track parallel to a longitudinal extension of the table and bending beams for the transfer of a workpiece between a feeding or stacking device for the boards or workpieces and a shaping area between the bending tools and with at least one control and monitoring device and the manipulator, a bending arm arrangement with three arms pivotable via pivot bearing arrangements about pivot axes aligned parallel to the running track and on a distal end of the bending arm arrangement a rotational unit is arranged, with a rotational axis running perpendicular to the pivot axes and the rotational unit is fitted with a gripping device and the latter comprises at least one detecting device connected by communication to the control and monitoring device, characterised in that the detecting device with several measuring elements arranged in a measurement plane forms a measuring device for a physical value causing a change in state of an arm of the bending arm arrangement upon loading and the measurement plane runs between the distal end of the bending arm arrangement and the rotational unit.

2. Production device according to claim 1, characterised in that the measuring elements of the measuring device are connected by line to a charge amplifier.

3. Production device according to claim 1, characterised in that the measuring elements are formed by quartz sensors.

4. Production device according to claim 1, characterised in that the measurement plane runs in a joint face running perpendicular to the rotational axis of the rotational device.

5. Production device according to claim 3, characterised in that the quartz sensors are tensioned by a pretensioning force between opposite tensioning surfaces running parallel to the measurement plane.

6. Production device according to claim 3, characterised in that the quartz sensors are pretensioned between an end face part of the C-arm and a flange of the rotational device.

7. Production device according to claim 3, characterised in that the quartz sensors are arranged in the measurement plane in the form of a regular polygon.

8. Production device according to claim 2, characterised in that the charge amplifier is line-connected via an interface to a control system of the production device.

9. Production device according to claim 1, characterised in that the detecting device is designed to be bussable in particular CAN bussable.

10. Method for controlling a loading process in the production device according to claim 1, by monitoring the state of the bending arm arrangement of the manipulator for loading the bending press for performing a shaping process on a board or a workpiece, characterised in that a physical parameter provided for the detection and causing the change in state on picking up a board or a workpiece with the gripping device in the bending arm arrangement is saved in a file of a computer module and after picking up the board or the workpiece the physical value determined by the detection device is compared with the saved physical parameter in a comparator circuit and in the case of a deviation exceeding a fixed tolerance range the loading process is stopped and an error message is given.

* * * * *

UNITED STATES PATENT AND TRADEMARK OFFICE
CERTIFICATE OF CORRECTION

PATENT NO.        : 8,424,359 B2                                             Page 1 of 1
APPLICATION NO. : 12/161394
DATED             : April 23, 2013
INVENTOR(S)       : Theis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1311 days.

Signed and Sealed this
Eighth Day of September, 2015

Michelle K. Lee
*Director of the United States Patent and Trademark Office*